US011128703B2

(12) United States Patent
Virani et al.

(10) Patent No.: US 11,128,703 B2
(45) Date of Patent: Sep. 21, 2021

(54) METHOD AND APPARATUS FOR MANAGING PEER-TO-PEER (P2P) COMMUNICATION IN WIRELESS MESH NETWORK

(71) Applicant: Cutting chai technologies Pvt. Ltd., Mumbai (IN)

(72) Inventors: Anand Fattechand Virani, Mumbai (IN); Smeet Somaiya, Mumbai (IN)

(73) Assignee: CUTTING CHAI TECHNOLOGIES PVT. LTD., Mumbai (IN)

( * ) Notice: Subject to any disclaimer, the term of this patent is extended or adjusted under 35 U.S.C. 154(b) by 239 days.

(21) Appl. No.: 16/343,713

(22) PCT Filed: Oct. 20, 2017

(86) PCT No.: PCT/IN2017/050485
§ 371 (c)(1),
(2) Date: Apr. 19, 2019

(87) PCT Pub. No.: WO2018/073842
PCT Pub. Date: Apr. 26, 2018

(65) Prior Publication Data
US 2019/0273777 A1   Sep. 5, 2019

(30) Foreign Application Priority Data

Oct. 20, 2016   (IN) .............................. 201621035963

(51) Int. Cl.
*H04L 29/08*   (2006.01)
*H04W 76/14*   (2018.01)
(Continued)

(52) U.S. Cl.
CPC ............ *H04L 67/104* (2013.01); *H04L 67/18* (2013.01); *H04L 67/303* (2013.01); *H04W 4/023* (2013.01);
(Continued)

(58) Field of Classification Search
CPC ..... H04L 67/104; H04L 67/18; H04L 67/303; H04W 4/023; H04W 8/005; H04W 76/14;
(Continued)

(56) References Cited

U.S. PATENT DOCUMENTS

| 10,713,686 B2 * | 7/2020 | Shiffert | ............... G06Q 30/0261 |
| 2011/0179064 A1 * | 7/2011 | Russo | ..................... H04L 67/28 |
| | | | 707/769 |

(Continued)

*Primary Examiner* — Faruk Hamza
*Assistant Examiner* — Abusayeed M Haque

(57) ABSTRACT

Embodiments herein provide a method for managing Peer-to-Peer (P2P) communication in a Wireless mesh network. The method includes discovering, by a first wireless device, a presence of at least one second wireless device and a distance between the first wireless device and at least one second wireless device in proximity, in the Wireless mesh network using a combination of BLE and WFD interface. Further, the method includes determining, by the first wireless device, a match between a profile data of the first wireless device with a profile data of the at least one second wireless device based on the presence of the at least one second wireless device and distance between the first wireless device and at least one second wireless device in proximity. Furthermore, the method includes sending, by the first wireless device, a profile matching notification to the at least one second wireless device using the BLE interface.

27 Claims, 7 Drawing Sheets

(51) Int. Cl.
*H04W 84/18* (2009.01)
*H04W 4/02* (2018.01)
*H04W 8/00* (2009.01)
*H04W 64/00* (2009.01)
H04W 84/12 (2009.01)
H04W 4/80 (2018.01)
H04W 8/22 (2009.01)

(52) U.S. Cl.
CPC ......... *H04W 8/005* (2013.01); *H04W 64/003* (2013.01); *H04W 76/14* (2018.02); *H04W 4/02* (2013.01); *H04W 4/80* (2018.02); *H04W 8/22* (2013.01); *H04W 84/12* (2013.01); *H04W 84/18* (2013.01)

(58) Field of Classification Search
CPC ......... H04W 4/80; H04W 84/18; H04W 4/08; H04W 76/15
See application file for complete search history.

(56) References Cited

U.S. PATENT DOCUMENTS

| | | | |
|---|---|---|---|
| 2017/0134182 A1* | 5/2017 | Davis | G01D 4/006 |
| 2017/0318412 A1* | 11/2017 | Schramm | H04W 4/80 |
| 2018/0242135 A1* | 8/2018 | Lee | H04W 8/005 |
| 2018/0373304 A1* | 12/2018 | Davis | H01H 9/56 |
| 2019/0045034 A1* | 2/2019 | Alam | H04L 67/30 |
| 2020/0404069 A1* | 12/2020 | Li | H04L 67/289 |

* cited by examiner

METHOD AND APPARATUS FOR MANAGING PEER-TO-PEER (P2P) COMMUNICATION IN WIRELESS MESH NETWORK

The embodiments herein relate to wireless mesh network communication and more particularly relates to a method and apparatus for managing Peer-to-Peer (P2P) communication in wireless mesh network. The present application is based on, and claims priority from an Indian Application Number 201621035963 filed on 20 Oct. 2016 and PCT/IN2017/050485 filed on 20 Oct. 2017 the disclosure of which is hereby incorporated by reference.

FIELD OF INVENTION

Background

In general, beacon devices utilizes Bluetooth (e.g., Bluetooth Low Energy (BLE)) connection for broadcasting data signals to other electronic devices (smartphone, cellular phone, mobile phone, etc.) in proximity to the beacon devices. The Beacon devices, due to constraints in the Bluetooth technology, can be able to broadcast only a limited data signal (i.e., Beacon ID, URL, codes, etc.) to the other electronic devices. This means, amount of data to be transmitted by the Beacons is limited thereof.

On the other hand, the other electronic devices in response to receiving (or, detecting) the broadcasted data signals can drive one or more actions corresponding to the broadcasted data signals thereto. The actions such as, for e.g., displaying of an advertisement content, offers currently at "A" block in a shopping mall, owner cloud catalog database, etc. Albeit, the beacon devices confines with limited data broadcasting capability but the deployment of vast number of Beacons along with necessary infrastructure to manage the operations of all the Beacons can, thereby, intuitively be able to provide the services with ease.

This translates to high complexity and cost of deployment of the beacon devices. This means only a larger commercial sectors (e.g., larger brands, large format, organized retail outlets and businesses with deep pockets, or the like) which are able to meet demand (i.e., the high complexity and cost of deployment can the beacon devices) can only be able to effectively leverage the services provided by the beacon devices.

There are also other problems with existing technology on the beacon devices, described below:
1. Network challenges-BLE's short range (30-50 ft without wall obstructions) requires lot more beacon devices to cover a given area than Wi-Fi access points
2. Accuracy challenges-Placing more beacon devices in an area to compensate for network coverage can lead to coverage overlaps and multiple IDs being received by the mobile device. This can create a lot of confusion to the applications that expect a single ID to present information accurate to the exact location of the device.
3. Security challenges-Beacon IDs can be spoofed or reprogrammed, so a hacker could disrupt the operations of the beacon devices. Major beacon device providers offer ways to lock down the ID and authenticate changes based on a user's account information before allowing the change to occur. This requires managing each beacon device complying with account credentials, adding to deployment complexity.
4. Information management challenges-Marketer applications need to keep track of all Beacon IDs and map them to whatever content or function their detection needs to trigger. It's not only an inventory issue but a highly localized mapping of ID to contextual application activity. The more locations you use beacon devices, and the more the things they are associated to change, the harder this information management challenge becomes.

Thus, it is desired to address the above mentioned disadvantages or other shortcomings or at least provide a useful alternative.

OBJECT OF INVENTION

The principal object of the embodiments herein is to provide method and apparatus for managing Peer-to-Peer (P2P) communication in Wireless mesh network.

Another object of the embodiments herein is to provide a wearable device configured to perform the P2P communication with other wearable devices and one or more wireless devices in the Wireless mesh network.

Another object of the embodiments herein is to provide a wearable device configured to perform the P2P mesh operation with other wearable devices and one or more wireless devices in the Wireless mesh network.

Another object of the embodiments herein is to provide a wearable device utilizing motion and position sensors data to recognise user activity for purpose of controlling start and stop operations of the wearable device, and operations of one or more wireless devices connected to the wearable device.

Another object of the embodiments herein is to provide a wearable device configured to provide a relay communication services with other wearable devices and one or more wireless devices in the Wireless mesh network.

SUMMARY

The embodiments herein provide a method for managing Peer-to-Peer (P2P) communication in a Wireless mesh network. According to the proposed method, a wearable device is provided which is configured to establish the P2P mesh communication with one or more other wearable devices and one or more mobile devices. In one aspect, the proposed method can be used by the wearable device/the wearable can be configured to perform a broadcasting of the advertisement signaling messages, scanning to detect the presence of the one or more other wearable devices and one or more mobile devices in proximity, and scanning to detect the advertisement signaling messages from the one or more other wearable devices and one or more mobile devices can be executed using BLE and WFD interface. Further, the proposed method can be used by the wearable device/the wearable can be configured to exchange the advertisement data (media content, chart options, etc.) with proximal mobile devices (or WFD peers) using WFD. Thus a WFD P2P communication can be established between the wearable device and the other mobile device for exchanging the profile data there between.

In another aspect of the invention, the proposed method can be used by the wearable device/the wearable can be configured to utilize a motion and position sensors data to recognise user activity for purpose of controlling operations the services provided by the wearable device and other mobile devices to save on battery usage when there are no other users in proximity to communicate with.

Accordingly the embodiments herein provide a first wearable device for managing Peer-to-Peer (P2P) communication in a wireless mesh network, comprising a processor, a memory, and an operational controller, operably coupled with the memory and the processor, configured to receive a relay message from a second wearable device in the wireless mesh network over a WFD interface, wherein said relay message includes a destination identifier indicating a third wearable device and a profile data of the second wearable device, wherein the first wearable device is in range of the second wearable device and is not in range of the third wearable device. Further, the operational controller can be configured to determine a route to the third wearable device based on a local device list stored at the second wearable device (or, the first wearable device). Further, the operational controller is configured to determine a next hop-mobile device based on the route to the third wearable device in the wireless mesh network, where the source wearable device is in range to the next-hop device, and send the relay message to the next hop-mobile device over a WFD interface. In another e.g., the first wearable device is in range to the next-hop device, and send the relay message to the next hop-mobile device over the WFD interface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
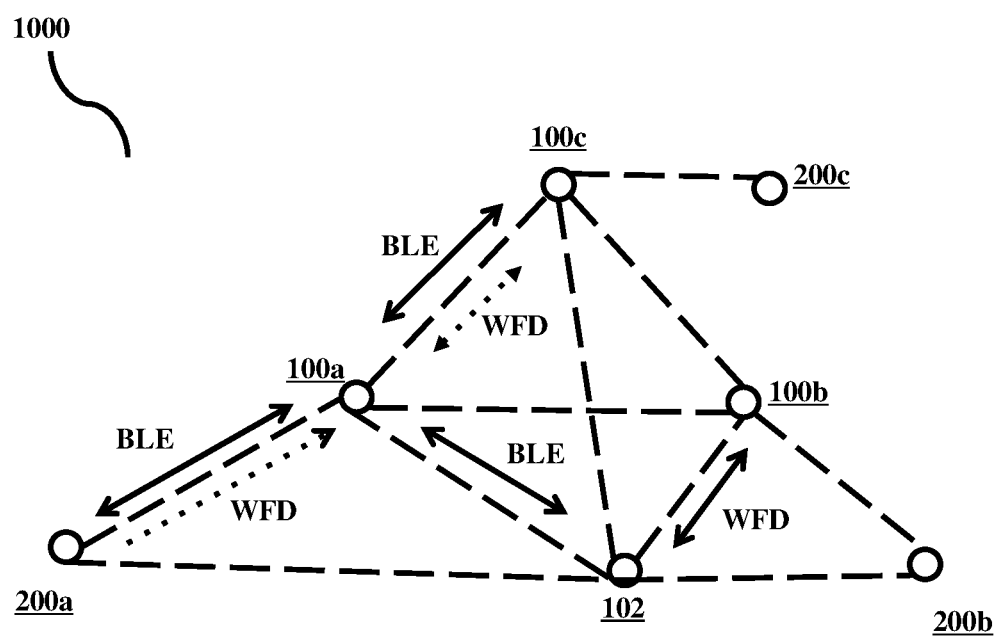
FIG. 1 is an example illustrating a wireless mesh network, according to embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this invention belongs Bandit Device:

Wearable device configured to utilize a combination of BLE and Wi-Fi direct (WFD) technology for discovery and connecting with other BandIt devices, mobile devices in proximity to form a wireless mesh network.

Peer-to-peer (P2P) networking or computing is a distributed application architecture that distributes application tasks between peers. In a P2P architecture, peers are equally privileged and capable participants in the application. Peers can be both suppliers and consumers of resources, in contrast to the traditional client-server model. Peers make decisions on tasks, perform tasks and communicate directly with other peers, without the need for central coordination by servers or hosts. In a mesh network, the node decides 'dynamically' or 'ad-hoc' which route data packets take. In wireless or mobile networks, mesh networking has the advantage that every node adapts dynamically to changes in the structure or 'topology' of the network.

Thus, according to the proposed method a BandIt device acts as a node in a peer-peer wireless mesh network comprising of other BandIt and mobile devices as peer nodes, that communicate using wireless technologies Unlike to conventional methods and conventional systems, the proposed method can be used to overcome the limitation (as detailed below) of the beacon devices (as detailed in Background).

1. Network challenges-BandIt supports longer range BLE operation with advertisement service optimized for range versus power since it can be charged overnight as opposed to a battery powered Beacon expected to last years.

2. Accuracy challenges-The BandIt connected to mobile devices is configured to handle BandIt coverage overlaps and multiple IDs being received. The proposed method can be used to compute multiple ID's correlating to signal strengths to present information accurate to the exact location of the user of the mobile device.

3. Security challenges-BandIt authenticates data packets exchanged with other BandIt and mobile devices through encrypted service identifier. Thus, the proposed method can be used to provide higher level of security built-in based on a user's account credentials. Managing BandIt to the user account mapping is easy through the multiple configuration on the BandIt.

4. Information management challenges-BandIt is configured to exchange data (capability, user ID and profiles) with the mobile devices in proximity Thus, the proposed method can be used to determine a match between the profiles of first user (consumers) and second user (Marketers) in a real-time, notify the consumer and Marketers of the profile match, and to deliver a real-time contextual marketing experience without the cost and complexity described in conventional technique using beacon devices (background).

Referring now to the drawings, and more particularly to FIGS. 1 through 6, where similar reference characters denote corresponding features consistently throughout the figures, there are shown preferred embodiments.

FIG. 1 is an example illustrating a wireless mesh network 1000, according to embodiments as disclosed herein.

In an embodiment, the wireless mesh network 1000 includes a plurality of first wireless devices 100a-100c (hereinafter interchangeably used as the first wireless device 100) and a plurality of second wireless devices 200a-200c (hereinafter interchangeably used as the second wireless device 200). The first wireless device 100 and the second wireless device 200 may be any mobile device that supports the P2P communication, including, but not limited to, a wearable device, a cellular device, a an electronic tablet, a personal digital assistant (PDA), a portable gaming device, or the like.

The first wireless device 100 can be configured to recognize the second wireless device 200 (or, vice versa) that is identified as an available participant in the P2P communication (e.g., within the network range of the wireless mesh network 1000). The first wireless device 100 and the second wireless device 200 (within proximity of the first wireless device 100) can be configured to recognize and establish the P2P communication there between.

In an embodiment, the first wireless device 100 discovers the second wireless device 200 to be available for the P2P communication. In an embodiment, the first wireless device 100 discovers and exchange parameters with the second wireless device 200 using a combination of Bluetooth Low Energy (BLE) and Wi-Fi Direct (WFD) interface.

Following is the discovery procedure to establish a connection between first wireless device 100 and the second wireless device 200 (or, vice versa). In virtue of providing more clarity, consider the first wireless device 100a-100c as the wearable device (BandIt device 100a-100c).

P2P Beaconing Between BandIt 100a and the Second Wireless Device 200a:

Referring to the FIG. 1, initially, the BandIt device 100a broadcasts an advertisement service message using BLE. The advertisement service message includes the information related to a service of interest, type of advertisement (BandIt device 100a to the second wireless device 200a), profile data of the BandIt device 100a, WFD connection capabilities supported by the BandIt device 100a.

If BLE adapter is ON at the second wireless device 200a, the second wireless device 200a performs a scanning process by sweeping an antenna element associated therewith for receiving the advertisement message broadcasted by the BandIt device 100a. Once, the second wireless device 200a detects the advertisement service message, the second wireless device 200a can receive and store the information pertaining to the advertisement service message. In one or more possible variations of the invention, the information pertaining to the advertisement service message can be stored locally in a memory of the second wireless device 200a. In one or more possible variations of the invention, the information pertaining to the advertisement message can be stored on a network (i.e., cloud, ad-hoc, etc.) and can be accessible through wireless communications means (i.e., interna).

Once the second wireless device 200a identifies a change in the advertisement service message (i.e., service info related to the advertisement message), then the second wireless device 200a establishes the BLE connection with the BandIt 100a to send the information related to a service of interest, profile data of the second wireless device 200a, WFD connection capabilities supported by the second wireless device 200a, the location information of the second wireless device 200a, and to receive information related to a service of interest, profile data of peer devices stored at the BandIt 100a. The peer devices includes, for e.g., BandIt devices 100b-100c and second wireless device 200b-200c.

In embodiment, the BandIt device 100a can be configured to determine current location of the BandIt device 100a in the wireless mesh network 1000 using a plurality of sensors associated therein. Based on the location determined between the BandIt device 100a and the second wireless device 200a, the BandIt device 100a can, therefore, be configured to automatically generate a service message. In an embodiment the service messages includes information related to a service of interest, a profile data of the BandIt device 100a, WFD capabilities supported by the BandIt device 100a, the location information of the BandIt device 100a, service messages of other peers devices (BandIt device 100b-100c, and second wireless device 200b-200c) stored at the BandIt device 100a, and location of other peer devices stored at the BandIt device 100a.

If the BLE adapter at the second wireless device 200a is OFF (i.e., disabled), then the second wireless device 200a can be configured to broadcast the advertisement service message using WFD interface. In an embodiment, the advertisement service message includes, information related to a service of interest, a profile data of the second wireless device 200a, WFD capabilities supported by the second wireless device 200a, the location information of the second wireless device 200a. In an embodiment, the second wireless device 200a can be configured to automatically switch to the WFD advertisement in response to determining that the BLE adapter is in disabled mode. For e.g., the second wireless device 200*a* advertises (CC service packet type=Consumer to BandIt) encapsulated into WFD DNS SD and TXT record packets (in future using Wi-Fi aware or any other close range low power P2P technology).

In an embodiment, the BandIt device 100*a* can be configured to establish a BLE connection with the second wireless device 200*a* to transmit the BandIt service message.

Further, the BandIt 100*a* receives the service message from the second wireless device 200*a* over the BLE connection/WFD DNS SD and TXT record packets (the received packets are stored in the memory of the BandIt 100*a*, for future reference). In one or more possible variations of the invention, the information pertaining to the service message can be stored locally in a memory of the BandIt 100*a*. In one or more possible variations of the invention, the service message can be stored on the network and can be accessible through wireless communications means.

Unlike to conventional methods and systems, the BandIt 100 and the second wireless device 200 can connect with each other over WFD using the parameters exchanged (via the communication of the advertisement service messages there between) during discovery/beaconing phase. The connections are used to exchange data that includes Profile details, media/content, URLs, files and to support interactions.

P2P Beaconing Between the BandIt 100*a* and BandIt 100*b*:

Similar to the aforementioned communication process, the BandIt 100*a* broadcast the advertisement message over the BLE. The advertisement message include a type of service (the BandIt 100*a* to BandIt 100*b*) associated with the advertisement message, a name of the service associated with the advertisement message, trigger value (change since last advert−1 bit, where 0=no change, 1=change) in order to detect a track the change in the advertisement message, etc. The BandIt 100*b* performs a scanning by sweeping an antenna element associated therewith for receiving the advertisement message broadcasted by the BandIt device 100*a*. Once, the BandIt 100*b* detects the advertisement message, the BandIt 100*b* can be configured to store the information pertaining to the advertisement message in the memory of the BandIt 100*b*.

Once the BandIt 100*b* determines that the trigger value of the advertisement message meets a threshold criteria (first advert or change since last advert=1), then the BandIt 100*b* can be configured to initiate a BLE connection with the BandIt device 100*a* to communicate: the profile stored on each of the BandIt 100*a* and BandIt 100*b*, location information of the BandIt 100*a* and BandIt 100*b*, etc.

P2P Connection Between the BandIt 100*a* and the Second Wireless Device 200*a*:

In an embodiment, the BandIt 100*a* broadcast the advertisement message (including a profile data e.g., Type code, Interest codes, etc.) over the BLE, to the second wireless device 200*a*. In an embodiment, the type code can be for e.g., type of advertisement such as clothing accessories, media related information, shopping requirement, payment related information etc. The type code can be derived from one or more applications associated and configured by a BandIt user mobile device 102 on the BandIt 100*a*.

For e.g., if the mobile device 102 associated with a shopping application "A" intends to purchase an object "B" from the shopping application "A", then a profile "B1" can be created by the mobile device 102 on BandIt 100*a* for advertising its availability.

In response to communicating the advertisement message the BandIt 100*a* and the second wireless device 200*a* can be configured to determine a match on the profile "B1" based on a presence of the at least BandIt 100*a* and the second wireless device 200*a* to be in each other's proximity Thereafter, if the BandIt 100*a* and the second wireless device 200*a* determines a match on profile "B1", then the second wireless device 200*a* can be configured to locally generate a notification indicating the match.

In an embodiment, the notification can be indicated via any such existing mechanism/mechanism yet to be known. The existing mechanism such as for e.g., through a display interface, audio signal, etc.

In response to determining the match, the second wireless device 200*a* can transmit a request message to the BandIt 100*a*, where the request message includes credentials required to establish the P2P communication there between, pre-exchanged during the P2P beaconing phase. In an embodiment, the second wireless device 200*a* and the BandIt 100*a* establishes the P2P communication using the WFD interface.

In an embodiment, a group owner and a group client in the P2P communication is dynamically determined based on intent parameters of the second wireless device 200*a* and intent parameters of the BandIt 100*a*. For e.g., considering the above example, the mobile device 102 is assigned as the group owner and the second wireless device 200*a* is assigned as the group client.

Unlike to conventional methods and systems, the proposed BandIt 100*a*, as the group owner, establishes the WFD connection with the second wireless device 200*a* to exchange profile data and allow other profile related interactions (e.g. Chat).

P2P Connection Between the BandIt 100*a* and the Mobile Device 102:

In conjunction with aforementioned P2P communication between the BandIt 100*a* and the second wireless device 200*a*, In case of a match, the BandIt 100*a* generates and transmits the service message to the mobile device 102 (e.g., CC service packet for second wireless device 200*a* to mobile device 102) over the BLE connection pre-established between the BandIt 100*a* and the mobile device 102 (e.g., BLE adapter is always enabled on the mobile device 102). In response to determine the match, the BandIt 100*a* can be configured to notify the mobile device 102.

Over the BLE connection, the BandIt 100*a* periodically transmits all the stored GPS coordinates (of BandIt devices 200*b*-200*c* and first wireless devices 100*a*-100*c*) to the mobile device 102 for determining the location.

P2P Connection Between the Second Wireless Device 200*a* and the Second Wireless Device 200*b*:

The second wireless device 200*a* and the second wireless device 200*b* can be configured to determine a profile match associated with each of the second wireless device 200*a* and the second wireless device 200*b*. In an embodiment, the BandIt 100*a* can be configured to communicate, the profile data of the second wireless device 200*b*, with the second wireless device 200*a*. Further, the BandIt 100*a* can be configured to communicate the profile data of the second wireless device 200*a* to the BandIt 100*b*.

For e.g., the BandIt 100*b* in connection with the second wireless device 200*b* can be configured to exchange the profile data there between. As in the wireless mesh network 1000 the BandIt 100*b* relays the profile data of the second wireless device 200*b* to the BandIt 100*a*. Thereafter, the BandIt 100*a* can transmit the received profile data of the second wireless device 200*b* to the second wireless device 200*a*. For all matches, the second wireless device 200*a* and the second wireless device 200*b* are simultaneously notified.

Figure 2:
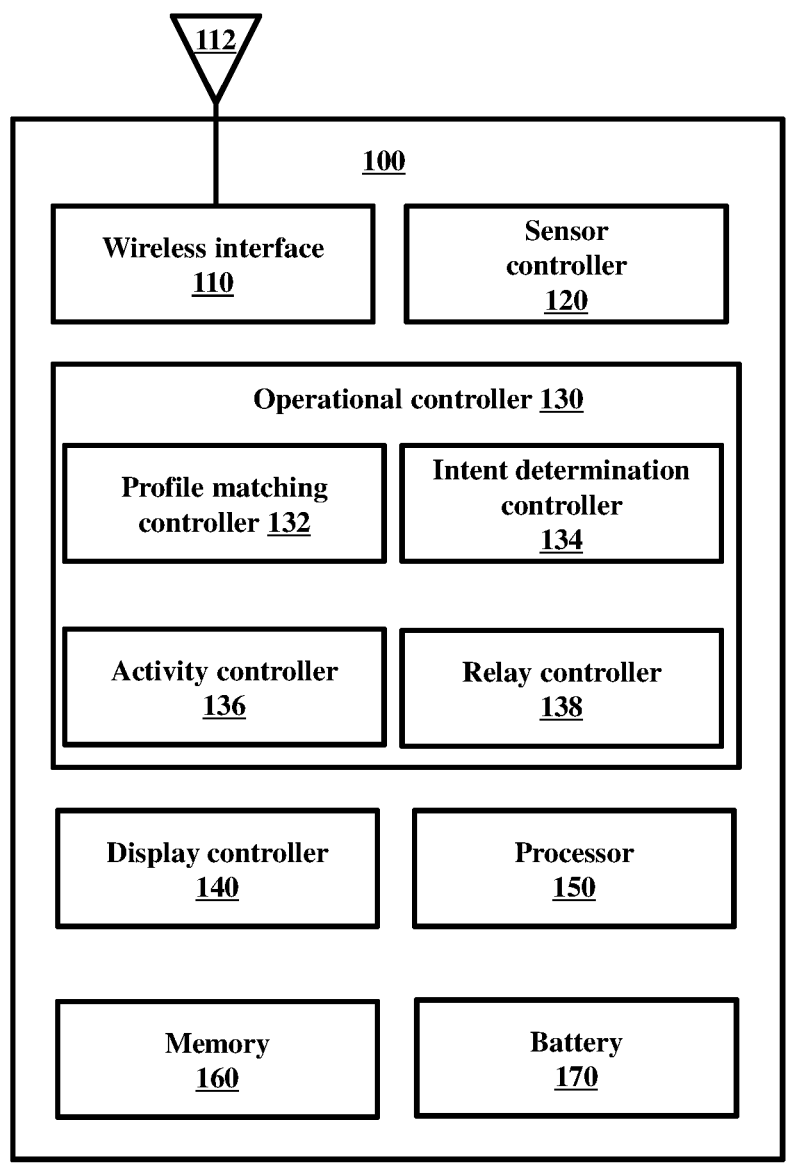
FIG. 2 is a block diagram illustrating various hardware components of a first wireless device, according to embodiments as disclosed herein.

FIG. 2 is a block diagram illustrating various hardware components of the BandIt 100, according to embodiments as disclosed herein.

Referring to FIG. 2, the BandIt 100 includes a wireless interface 110 connected to an antenna 112. The wireless interface 112 supports establishing a wireless connection to another wireless devices using the antenna 112 and exchanging data across an open connection. For e.g., the wireless interface 112 is a typical radio interface supporting an air interface, such as a local wireless protocol like Wi-Fi, WFD, Bluetooth, BLE, or the like. In another e.g., a different air interface can be supported, such as CDMA, or a non-radio interface, such as infrared, multiple wireless interfaces are also supported and/or one or more wired interfaces (e.g., IEEE-1394 or Ethernet). In another embodiment, the wireless interface 110 can be configured to provide a capability of both BLE and Wi-Fi. In yet another embodiment, the wireless interface 110 can be configured to provide a capability of both BLE and Wi-Fi simultaneously.

In an embodiment, the wireless interface 110 can be configured to manage the transmission and reception of the advertisement message associated with the BandIt 100 and the second wireless device 200 respectively. Further, wireless interface 110, based on the instruction received from an operational controller 130, can be configured to receive the request to establish the P2P communication from the second wireless device 200. Further, the wireless interface 110 can be configured to establish the P2P communication with the second wireless device 200 using the WFD interface (of the wireless interface 110).

In an embodiment, the BandIt 100 includes a sensor controller 120. The sensor controller 120 can include, for e.g., accelerometer sensors, gyroscope sensors, proximity sensors, GPS sensors, an acoustic sensor, display sensors, or the like. In an embodiment, the sensor controller 120 can be configured to manage the transmission and reception of the location information associated with the BandIt 100 and the second wireless device 200 respectively. The location information, for e.g., GPS coordinates.

The operational controller 130 is coupled to the wireless interface 110 and the sensor controller 120. The operational controller 120 can be configured to control the operations of the BandIt 100 and its components. In an embodiment, the operational controller 130 can include, for e.g., a profile matching controller 132, an intent determination controller 134, an activity controller 136, and a relay controller 138.

In an embodiment, the profile matching controller 132 can be configured to determine the match between the profile data of the BandIt 100 with the profile data of the second wireless device 200 based on the presence of the second wireless device 200 and distance between the BandIt 100 and the second wireless device 200 in proximity. Further, the profile matching controller 132 can be configured to sending the profile matching notification to the second wireless device 200 using the BLE interface (of the wireless interface 110).

In an embodiment, the sensor controller 120 can be configured to facilitate e.g., for illumination of a Light Emitting Diode (LED)/an audio signal indicating the response outputted by the profile matching controller 132.

In an embodiment, the intent determination controller 134 can be configured to determine the intent parameters associated with the advertisement message. The intent parameters can be defined based on, for e.g., type of service, location information, capability, current status (battery status, computational power status, etc.). Thus, in response to determining the intent parameters the intent determination controller 134 can be configured to classify the group owner and the group client for the P2P communication based on the determined intent parameters of the BandIt 100 and based on the received intent parameters of the second wireless device 200.

Further, based on the instructions from the intent determination controller 134, the wireless interface 110 can be configured to establish the P2P communication as the group owner with the second wireless device 200 (group client) using the WFD interface.

In an embodiment, the activity controller 136 can be configured to dynamically determining a state of the BandIt 100 and an activity of the user of the BandIt 100. In an embodiment, the state of the BandIt 100 includes, for e.g. battery percentage, temperature value, adapter status of the wireless interface 110, etc. In an embodiment, the activity information of the user can be, for e.g., motion information of the user, a posture information of the user, and an action performed by the user, etc.

In an embodiment, the activity controller 136 can be configured to utilize the activity state data received from the sensor controller 120 to recognise the posture information of the user, the user position information, accelerometer data such as for e.g., user still, user walking, user running, user driving, etc. Further, the user hand position using Gyrometer data such as for e.g., down, holding object (the BandIt 100, etc.).

Further, the activity controller 136 can be configured to map the activity state data with the GPS coordinate received from the location sensors of the activity controller 136. For e.g., user is STILL, then walking, then still again=the activity controller 136 updates its GPS coordinates that are locally stored. Any other activity recognised, user STILL again=the activity controller 136 updates its GPS coordinates and sends to the paired user mobile device 102 (not shown in the FIG. 2) for determining the location information.

Other examples for activity combinations recognised to control the service state of the BandIt 100 includes:
1. User STILL+Hands DOWN=Service running (LOW scan and advertisement delay);
2. User STILL+Hands HOLDING OBJECT=Service modified (MID scan and advert delay);
3. User WALKING+Hands DOWN=Service modified (MID scan and advert delay);
4. User WALKING+Hands HOLDING OBJECT=Service modified (MID scan and advert delay).

Further, the activity controller 136 can be configured to manage operations of the BandIt 100, the operations such as for e.g., operations of the the battery 170 (hereinafter referred as battery) level related services, and other operations of the BandIt 100, listed below:
1. Stop all Services-Battery level is at 10%;
2. Restart Services-Battery level is greater than 10%;
3. Increase scan interval to MID (3 sec)-Battery at or lower than 30%;
4. Reduce scan interval to LOW (600 ms)-Battery at 50% or higher;
5. Increase advertisement delay to MID (5 sec)-Battery at or lower than 30%;
6. Reduce advertisement delay to LOW (1 sec)-Battery level at 50% or higher;
7. Default values of LOW and MID.

Further, the relay controller 138 can be configured to receive a relay message from the second wearable device in the Wireless mesh network 100 over the WFD interface. In an embodiment, the relay message includes, for e.g., a destination identifier indicating a third wearable device and a profile data of the second wearable device, where the second wearable device has the P2P communication with the BandIt 100 and does not have a P2P communication with the third wearable device (for e.g., BandIt 100a and second wearable device 100b, as shown in FIG. 1).

Further, the relay controller 138 can be configured to determine a route to the third wearable device based on a local device list stored at the BandIt 100.

Further, the relay controller 138 can be configured to determine a next hop-mobile device based on the route to the third wearable device in the wireless mesh network 1000, where the relay controller 138 is in range of the next-hop device. Furthermore, the relay controller 138 can be configured to send the relay message to the next hop-mobile device over the WFD interface.

Figure 6:
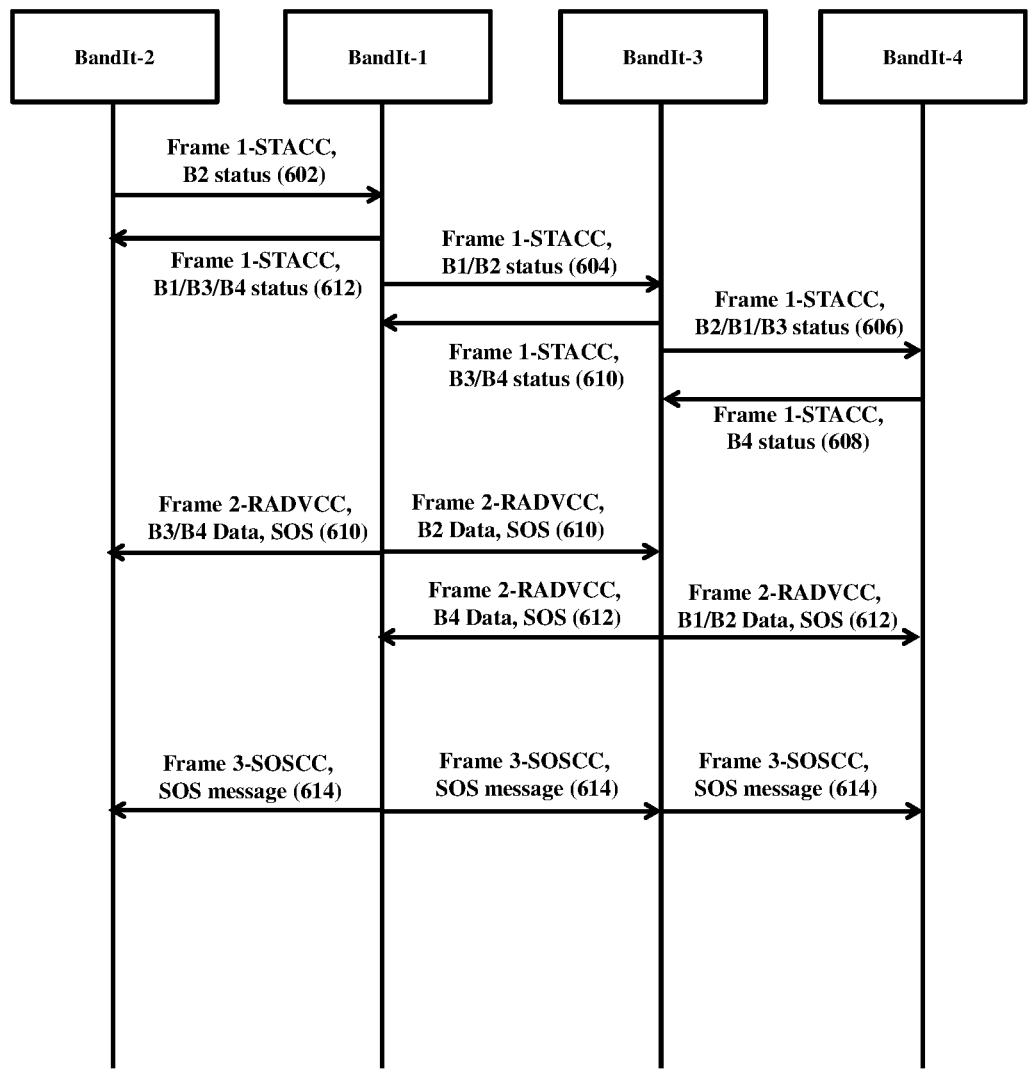
FIG. 6 is a sequence diagram illustrating various signaling messages communicated between BandIt devices, according to embodiments as disclosed herein.

All the aforementioned operations of the relay controller 138 is explained by using the FIG. 6.

In an embodiment, the display controller 140 (e.g., a Cathode Ray Tube (CRT) display, a Liquid Crystal Display (LCD), Organic Light-Emitting Diode (OLED), a Light-emitting diode (LED) can be configured to display the advertisement messages, and all other UI feature of the proposed method. In an embodiment, a processor 150 (e.g., Central processing unit (CPU), Graphics processing unit (GPU), hardware chipset, etc.) communicatively coupled to a memory 160 (e.g., a volatile memory and/or a non-volatile memory). The memory 160 includes storage locations configured to be addressable through the processor 150, and a communicator (not shown) configured to communicate internally with aforementioned hardware components, other hardware components, and externally with other components/electronic devices through any of the existing network communication means.

In alternative embodiment, all the aforementioned hardware components of the BandIt 100, shown herein, can be implemented even at the second wireless device 200 (illustration and explanation is avoided for sake of brevity and conciseness).

The FIG. 2 shows exemplary hardware components of the BandIt 100 but it is to be understood that other embodiments are not limited thereon. In other embodiments, the BandIt 100 may include less or more number of hardware components. Further, the labels or names of the hardware components are used only for illustrative purpose and does not limit the scope of the invention. One or more hardware components can be combined together to perform same or substantially similar function in the BandIt 100.

Figure 3A:
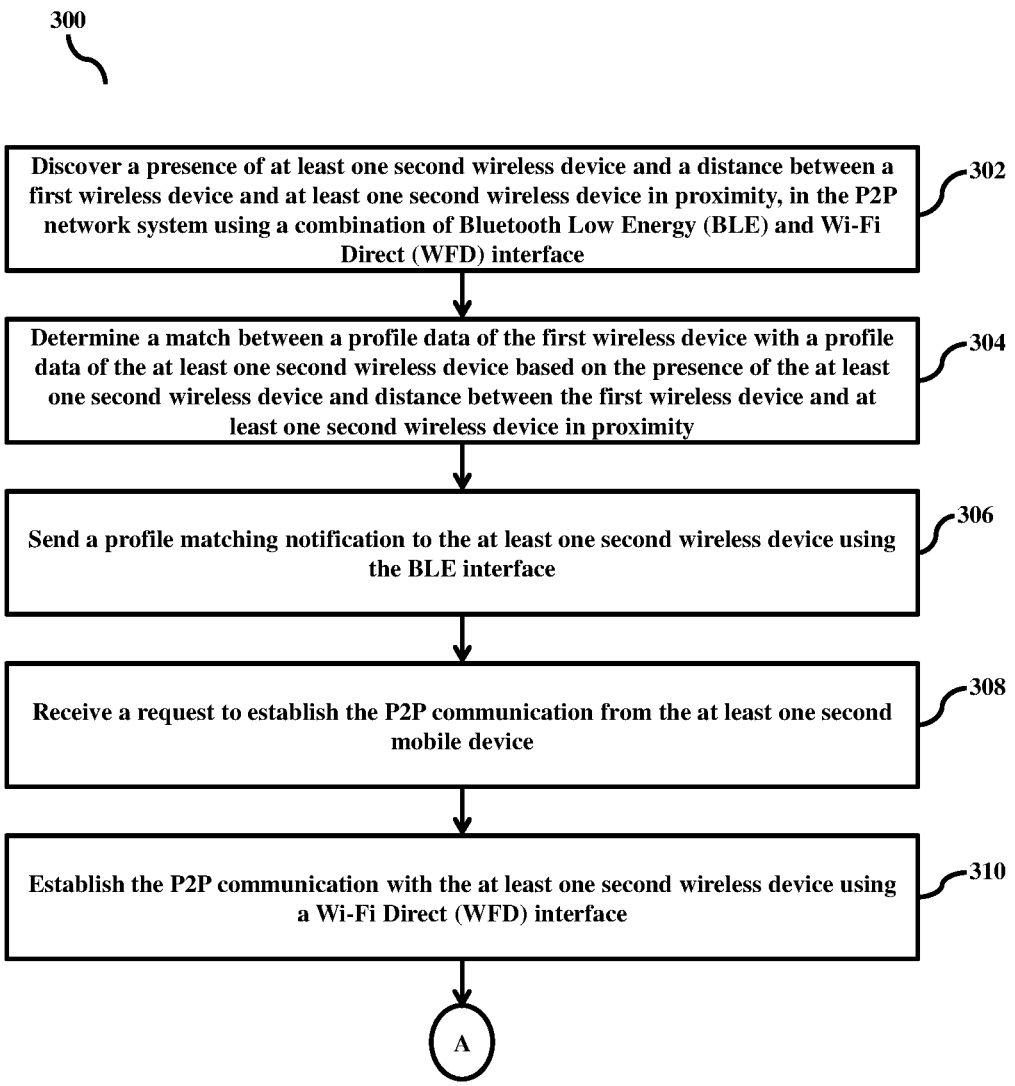
FIGS. 3A-3B is a flow diagram illustrating a method for managing the P2P communication between the first wireless device and a second wireless device, according to embodiments as disclosed herein.
Figure 3B:
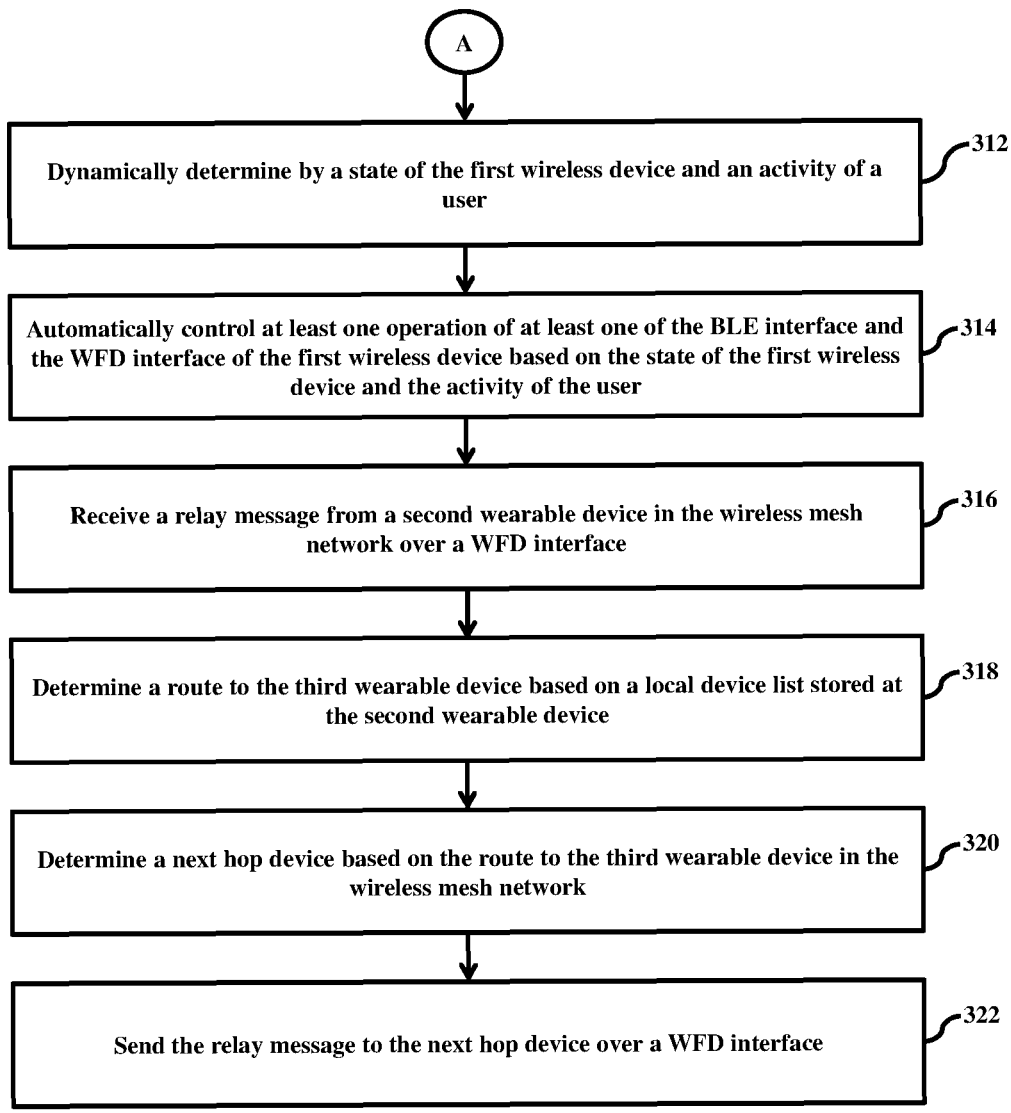

FIGS. 3A-3B is a flow diagram 300 illustrating a method for managing the P2P communication between the BandIt 100 and the second wireless device 200, according to embodiments as disclosed herein.

At step 302, the method includes discovering the presence of at the second wireless device 200 and the distance between the BandIt 100 and the second wireless device 200 in proximity, in the wireless mesh network 1000 using the combination of BLE and WFD interface. In an embodiment, the method allows the operational controller 130 to discover the presence of at the second wireless device 200 and the distance between the BandIt 100 and the second wireless device 200 in proximity, in the wireless mesh network 1000 using the combination of BLE and WFD interface.

At step 304, the method includes determining the match between the profile data of the BandIt 100 with the profile data of the second wireless device 200 based on the presence of the second wireless device 200 and distance between the BandIt 100 and the second wireless device 200 in proximity.

In an embodiment, the method allows the profile matching controller 132 to determine the match between the profile data of the BandIt 100 with the profile data of the second wireless device 200 based on the presence of the second wireless device 200 and distance between the BandIt 100 and the second wireless device 200 in proximity At step 306, the method includes sending a profile matching notification to the second wireless device 200 using the BLE interface. At step 308, the method includes receiving the request to establish the P2P communication from the second wireless device 200. At step 310, the method includes establishing the P2P communication with the second wireless device 200 using the WFD interface.

At step 312, the method includes dynamically determining the state of the BandIt 100 and the activity of the user. In an embodiment, the method allows the activity controller 136 to dynamically determine the state of the BandIt 100 and the activity of the user.

At step 314, the method includes automatically controlling at least one operation of at least one of the BLE interface and the WFD interface of the BandIt 100 based on the state of the BandIt 100 and the activity of the user. In an embodiment, the method allows the activity controller 136 to automatically controlling at least one operation of at least one of the BLE interface and the WFD interface of the BandIt 100 based on the state of the BandIt 100 and the activity of the user.

At step 316, the method includes receiving the relay message from the second wearable device (i.e., BandIt 100b/100c) in the Wireless mesh network over the WFD interface. In an embodiment, the method allows the wireless interface 110 to receive the relay message from the second wearable device in the wireless mesh network 1000 over the WFD interface.

At step 318, the method includes determining the route to the third wearable device based on the local device list stored at the first wearable device. In an embodiment, the method allows the relay controller 138 to determine the route to the third wearable device based on the local device list stored at the first wearable device.

At step 320, the method includes determining the next hop-mobile device based on the route to the third wearable device in the Wireless mesh network 1000. In an embodiment, the method allows the relay controller 138 to determine the next hop-mobile device based on the route to the third wearable device in the Wireless mesh network 1000.

At step 322, the method includes sending the relay message to the next hop-mobile device over the WFD interface. In an embodiment, the method allows the relay controller 138 to send the relay message to the next hop-mobile device over the WFD interface.

For e.g., consumers have discerning and fast changing preferences i.e., specific brands, sizes, colours, price range. This is leading to high store footfalls but lower conversions. Meanwhile stores are under pressure from online retailers and due to high real estate costs, are unable to display every product and end up selling at unsold inventory at a heavy discount Unlike to conventional method and systems, the BandIt device provides a solution by which consumer preferences are discovered and fulfilled instantly, while stores sell the desired product to the right consumer with a personalised discount, and with the highest level of in-store engagement.

For e.g., consider a scenario in which the user searches for shirt size "XXXL", not commonly found in all clothing stores. According to the proposed method, the user can therefore create a profile "shirt of size "XXXL"" and stores in the memory 160. In another embodiment, the profile "shirt of size "XXXL"" can be automatically created by the mobile device of the user. That is, the mobile device can be configured to explore the user interest from the plurality of applications (shopping apps) installed at the mobile device. Further, the user at place "A" passes across a small boutique store (named designer "X") that the user has never visited. The owner of the store, in similar endeavour, also broadcasts profile "shirt of size "XXXL"" is available, discount if any, etc., from BandIt of the owner using BLE interface. Thus, the advertised profile of the BandIt device at the store matches the profile of the user, and generates a notification at the mobile device of the user indicating the availability of the "shirt of size XXXL" in the store. The user walks into the store, and is guided directly to the required shirt section, as the store owner is well aware of the user interest being communicated through the BandIt device.

Further, the store owner can also see the location of the user, chat with the user, exchange pictures of the shirt, etc., using WFD interface.

Figure 4:
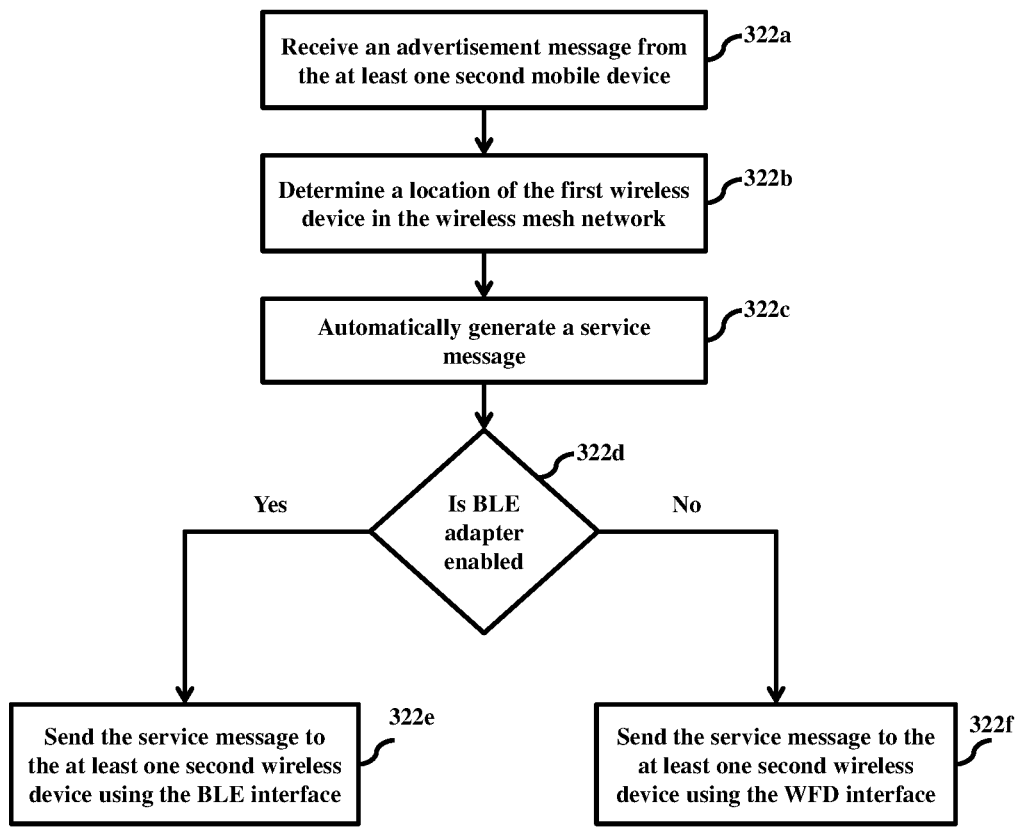
FIG. 4 is a flow diagram illustrating a method for discovering a location of the second wireless device in the Wireless mesh network, according to the embodiments as disclosed herein.

FIG. 4 is a flow diagram for discovering the location of the second wireless device 200 in the wireless mesh network 1000, according to the embodiments as disclosed herein.

At step 322a, the method includes receiving the advertisement message from the second wireless device 200. Further, at step 322b, the method includes determining the location of the BandIt 100 in the wireless mesh network 1000. Further, at step 322c, the method includes automatically generating the service message. Further, at step 322d, the method includes determining whether the BLE adapter is enabled. If at step 322d, the wireless interface 110 determines that the BLE adapter is enabled then, at step 322e, the method includes sending the service message to the second wireless device 200 using the BLE interface. If at step 322d, the wireless interface 110 determines that the BLE adapter is enabled then, at step 322f, the method includes sending the service message to the at least one second wireless device using the WFD interface.

Figure 5:
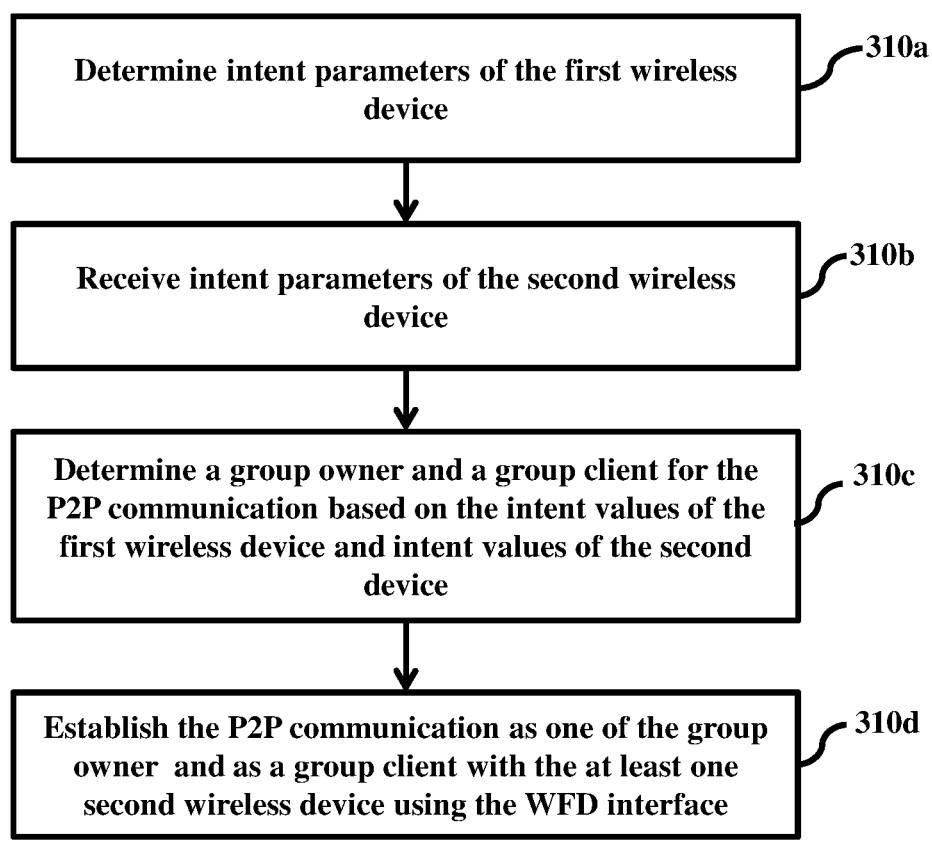
FIG. 5 is a flow diagram illustrating a method for establishing the P2P communication with the second wireless device using a WFD interface, according to the embodiments as disclosed herein.

FIG. 5 is a flow diagram illustrating a method for establishing the P2P communication with the second wireless device 200 using the WFD interface, according to the embodiments as disclosed herein.

At step 310a, the method includes determining intent parameters of the BandIt 100. Further, at step 310b, the method includes receiving the intent parameters of the second wireless device 200. Further, at step 310c, the method includes determining the group owner and the group client for the P2P communication based on the intent parameters of the BandIt 100 and intent parameters of the second wireless device 200. Furthermore, at step 310d, the method includes establishing the P2P communication as the group owner with the second wireless device 200 as a group client using the WFD interface.

FIG. 6 is a sequence diagram illustrating various signalling messages communicated between BandIt devices for establishing P2P communication, according to embodiments as disclosed herein. In conjunction with FIG. 1, a BandIt 100a-100d (can be referred as BandIt 1-4 in the FIG. 6), although BandIt 100d is not shown in FIG. 1, but the plurality of BandIts shown in FIG. 1 are not limited thereto, the number of BandIt devices can be up to 100n, without departing the scope of the invention.

In an embodiment, each BandIt broadcasts multiple frames simultaneously over WFD interface to maintain mesh operation with other BandIt devices in proximity. All cases outlined below assume that BLE and WFD adapters on BandIt devices are always ON and Bandit 2, 1, 3, and 4 are only visible adjacent Bandit devices in proximity. In an embodiment, the frame types communicated by the BandIt 1-4, as shown in Table. 2.

TABLE 1

| Frame type | Capability | Comments |
| --- | --- | --- |
| 1 | Mesh operation control data advertisement | Broadcast of the device's own status - Battery level, system alerts & proximal device status e.g. BandIt-2 is down to stop sending BandIt-2 data in the mesh network |
| 2 | Relay advertisement data | Relay all advertisement data that the device is listening to other proximal devices |
| 3 | Emergency/SOS advertisement | Supports emergency mode wherein an SOS message is broadcast that is detected by any other Bandit or mobile device (Bandit user or consumer) in proximity. All other services are stopped in this mode. |

Frame-1 Mesh Operation Control Data Advertisement:

Each BandIt devices 1-4 can be configured to communicate the device status associated therewith. For e.g., the Bandit-2 in P2P range with BandIt-1 can be configured to transmit (602) the current status to the BandIt-1. Similarly, the BandIt-1 can transmit (604) the status of BandIt-1 along with the stored status of the Bandit-2 to the BandIt-3. Further, the BandIt-3 can broadcast (606) the status of BandIt-3 along with the stored status of the BandIt-1 and the Bandit-2 to the BandIt-4. Although the Bandit-2 is not in the P2P range of the BandIt 3-4, the BandIt 3-4 can still be able to receive the service message.

Further, the Bandit-4 in P2P range with BandIt-3 can be configured to transmit (608) the current status to the BandIt-3. Similarly, the BandIt-3 can transmit (610) the status of BandIt-3 along with the stored status of the BandIt-4 to the BandIt-1. Further, the BandIt-1 can transmit (612) the status of BandIt-1 along with the stored status of the BandIt-3 and the Bandit-1 to the BandIt-2.

In an embodiment the status information includes, for e.g., Status message service name "STATCC"—6 bytes (encrypted), Self-Battery percentage-1 byte, Self-Temperature value-1 byte, Services status-1 byte (First bit-BLE advert service status, Second bit-BLE scan service status, Third bit-WFD advert service status, Fourth bit-WFD scan service status). (If any connection active)-Connection status-20 bytes (First 10 bytes for BLE connection including 6 bytes for mac id of the device connected to and Next 10 bytes for WFD connection including 6 bytes for mac id of the device connected to) etc.

As shown in FIG. 6, the Bandit 2 advertises the "STATCC" service name, battery level, temperature data, BLE and WFD connection status. The Bandit 1 and 2 receive the status message (from BandIt-2) and calculate the received power from frame's power level estimated at the respective receiving antennae at the physical layer. Thus, the Bandit-1 and Bandit-3 can be configured to estimate the location of Bandit-2 using the received status message from BandIt-2. The status message plus this distance estimate is stored on each Bandit. Based on estimated location (distance) and the device status (battery level and temperature), the Bandit-1 and Bandit-3 can set the probability of Bandit-1 presence in the Wireless mesh network 1000.

The status messages can be configured with a TTL i.e. the number of hops taken by each Bandit to travel so that every Bandit in the Wireless mesh network 1000 is aware about the status of other Bandit devices. Now, the Bandit-3 receives a packet from the Bandit-4 to be relayed to Bandit-2, the Bandit-2 scans for stored BandIt lists and forwards the data over "RADVCC" i.e., the relay channel which is received by Bandit-1 and forwarded on the same channel to the destination Bandit-2.

Unlike to conventional method and systems, the proposed method can be used in transmission, to provide a unique channel ID (instance name) for the status message Further, the Battery percentage and temperature will help transmit the Bandit's condition to immediate peers and automatically drop the packets aimed for that particular Bandit which is down. Further, the status of the BLE and WFD adapter on each device. (ON/OFF/connected).

Frame 2. Relay Advertisement:

As shown in FIG. 6, the relay packet "adds" its own header information to the original packet such as a relay advertisement service name "RADVCC"—6 bytes (encrypted), Bandit Hop Mac ID i.e., Own Mac ID-6 bytes, TTL-No. of hops the advertisement can travel-1 byte, and original packet-variable size.

The relay advertisement will forward the packet as is on the RADVCC instance and just add own identifier to determine the route at the receiving end and also decrement the TTL of the original message.

The Bandit-1 scans for detecting the presence of the Bandit-3 in proximity and WFD range of the Bandit-1. Each Bandit device 1-4 maintains a MAC-ID based current peers list and populates it on the basis of the status messages received from all visible Bandit devices. Now, Bandit 1 has its nearest mobile profile data to be relayed to all ID's associated with BandIt devices and other mobile devices stored in current peers list and it start's relaying (610) the data to the Bandit-3 over WFD interface on the relay advertisement channel dedicated to profile data relaying.

Further, the Bandit-3 and Bandit-4 detects the presence of the Bandit-4 and Bandit-2 respectively. Bandit 3 starts to relay (612) the mobile (consumer) profile data it received from the Bandit-4 to the Bandit-4 again over the "RADVCC" channel Consequently a connection-less mesh network is setup and Bandit-2 can now "reach" i.e. relay its nearest consumer's profile data to Bandit-4 going via Bandit-4 and the Bandit-3.

Frame 3. Emergency/SOS Frame:

The Bandit device going into an SOS mode advertises emergency service message over a predefined WFD channel and the packet details are for e.g., SOS message service name "SOSCC"—5 bytes (encrypted), SOS origination timestamp-10 bytes, (If Available) SOS origination co-ordinates (approx. 20 bytes) and error (3 bytes), SOS origination BandIt WFD peer MAC ID-6 bytes, SOS type/priority level (0-9-10 types/levels), SOS message-20 to 100 bytes. (Unencrypted), Total frame size-65-145 bytes.

This same frame is relayed by all other bandit's without adding their own information.

Field details-This is the unique channel ID (instance name) for the SOS message transmission. Timestamp when the SOS was generated, useful to determine if the SOS is outdated till it reaches a distant node. (If available) GPS co-ordinates plus Error in meters to estimate the location of the SOS generating device. The method can be used to pre-configure the common types of emergencies and their priority levels. The priority level will determine how SOS is treated at the receiving end and whether it should be relayed or not. SOS message in plaintext format The user of the Bandit-4 senses an emergency and enables the Bandit-4 in an SOS state. At this point of time, if the user of the Bandit-4 is connected to any peer/mobile device, the SOS frame can be transmitted to the connected peer/mobile device. Simultaneously, the Bandit-4 starts to advertise (614) a "SOSCC" service name which is received by peers in its immediate range (Bandit 3 in this case).

Further, the Bandit-3, will receive the SOS and verify from the SOS timestamp whether the SOS meets a threshold (e.g., more than 'X' hours old). If yes, the SOS will be discarded. If no, the Bandit-3 can be configured to determine the priority level associated with the SOS. If the priority level associated with the SOS is high enough, then the Bandit-3 can automatically enter into SOS state and relay (614) the original message to other Bandit devices visible to the Bandit-3 over the SOSCC logical channel.

Bandit-2 can be configured to receive (614) the SOS message from Bandit-4 and forwards in the mesh. The SOS messages will have the maximum TTL and shall be discarded only when the pre-defined durability of threshold expires. At each hop, the SOS message shall also be sent to the mobile device (consumer) and Bandit user mobile devices "connected" to the Bandit devices over BLE and WFD connection.

Although the embodiments of relaying herein are described with respect to wearable devices but it not limited thereto. The embodiments, for e.g., can be implemented on a Beacon device itself.

The embodiments disclosed herein can be implemented using at least one software program running on at least one hardware device and performing network management functions to control the elements The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for managing Peer-to-Peer (P2P) communication in a Wireless mesh network, comprising: discovering, by a first wireless device, a presence of at least one second wireless device and a distance between the first wireless device and at least one second wireless device in proximity, in the Wireless mesh network using a combination of a Bluetooth Low Energy (BLE) interface and Wi-Fi Direct (WFD) interface;

determining, by the first wireless device, a match between a profile data of the first wireless device with a profile data of the at least one second wireless device based on the presence of the at least one second wireless device and the distance between the first wireless device and at least one second wireless device in proximity; and sending, by the first wireless device, a profile matching notification to the at least one second wireless device using the BLE interface;

receiving, by the first wireless device a relay message from a second wireless device in the wireless mesh network over a WFD interface, wherein the relay message includes a destination identifier indicating a third wireless device and a profile data of the second wireless device, wherein the second wireless device is in range of the first wireless device and is not in range of the third wireless device;

determining by the first wireless device a route to the third wireless device based on a local device list stored in the second wireless device;

determining by the first wireless device a next hop-mobile device based on the route to the third wireless device in the wireless mesh network, wherein the second wireless device is in range of the next-hop device; and sending by the first wireless device the relay message to the next hop-mobile device over a WFD interface;

wherein each of the first wireless device, the second wireless device and the third wireless device exchange capability parameters with immediate next device in the P2P network to determine a received power from frame's power level estimated at respective receiving antennae at a physical layer, and wherein the received power is used to estimate distance between each of the first wireless device, the second wireless device and the third wireless device in the P2P communication network.

2. The method of claim 1, further comprising: receiving, by the first wireless device, a request to establish the P2P communication from the at least one second wireless device; and establishing, by the first wireless device, the P2P communication with the at least one second wireless device using the WFD interface.

3. The method of claim 2, wherein establishing, by the first wireless device the P2P communication with the at least one second wireless device using the WFD interface comprising:

determining at the first wireless device intent parameters of the first wireless device;

receiving intent parameters of the second wireless device;

determining a group owner and a group client for the P2P communication based on the intent parameters of the first wireless device and intent parameters of the second wireless device; and establishing the P2P communication as one of the group owner and as the group client with the at least one second wireless device using the WFD interface.

4. The method of claim 1, wherein the first wireless device, the second wireless device and the third wireless device is one of a wearable device and a non-wearable device.

5. The method of claim 1, wherein a group owner and a group client in the FP communication are dynamically determined based on intent parameters of the first wireless device and intent parameters of the second wireless device.

6. The method of claim 1, wherein the presence of at least one second wireless device and the distance between the first wireless device and at least one second wireless device in proximity, in the Wireless mesh network using a combination of the BLE interface comprising:

receiving an advertisement message from the at least one second wireless device, wherein the advertisement message comprises information related to a service of interest, a profile data of the at least one second wireless device, WFD capabilities supported by the at least one second wireless device, a location of the at least one second wireless device, service messages of other peer devices stored at the at least one second wireless device, and location of other peer devices stored at the at least one second wireless device;

determining by the first wireless device a location of the first wireless device in the Wireless mesh network;

automatically generating by the first wireless device a service message comprising information related to a service of interest, a profile data of the first wireless device, WFD capabilities supported by the first wireless device, the location of the first wireless device, service messages of other peers devices stored at the first wireless device, and location of other peer devices stored at the first wireless device;

determining at the first wireless device whether a BLE adapter is enabled; and performing by the first wireless device one of:

sending the service message to the at least one second wireless device using the BLE interface in response to determining that the BLE interface adapter is enabled, and sending the service message to the at least one second wireless device using the WFD interface in response to determining that the BLE interface adapter is disabled.

7. The method of claim 1, wherein the presence of at least one second wireless device and the distance between the first wireless device and at least one second wireless device in proximity, in the Wireless mesh network using a combination of the BLE interface comprising:

receiving, by the first wireless device, an advertisement message from the at least one second wireless device wherein the advertisement message comprises information related to a service of interest, a profile data of the at least one second wireless device, WFD capabilities supported by the at least one second wireless device, a location of the at least one second wireless device, service messages of other peers devices stored at the at least one second wireless device, and location of other peers stored at the at least one second wireless device;

automatically generating, by the first wireless device, a service message comprises information related to a service of interest, a profile data of the first second wireless device, WFD capabilities supported by the first wireless device, service messages of other peers devices stored at the first wireless device and location of other peers stored at the first wireless device;

sending, by the first wireless device the service message to the at least one second device using the BLE interface;

determining at the first wireless device a location information of the first wireless device in the Wireless mesh network; and sending by the first wireless device the location information to the second device using the BLE interface.

8. The method of claim 1, further comprising:

dynamically determining, by the first wireless device, a state of the first wireless device and an activity of a user; and automatically controlling, by the first wireless device, at least one operation of at least one of the BLE interface and the WFD interface of the first wireless device based on the state of the first wireless device and the activity of the user.

9. The method of claim 8, wherein the activity of the user comprises a motion information of the user, a posture information of the user, and an action performed by the user, and wherein the activity of the user is used to dynamically update the location of the first wireless device in the Wireless mesh network.

10. A method for managing P2P communication in a wireless mesh network, comprising:
    receiving by a first wearable device a relay message from a second wearable device in the wireless mesh network over a WFD interface, wherein said relay message includes a destination identifier indicating a third wearable device and a profile data of the second wearable device, wherein the first wearable device is in range of the first wearable device and not in range of the third wearable device;
    determining by the first wearable device a route to the third wearable device based on a local device list stored at the second wearable device;
    determining by the first wearable device a next hop-mobile device based on the route to the third wearable device in the wireless mesh network, wherein the first wearable device is in range of the next-hop device; and
    sending by the first wearable device the relay message to the next hop-mobile device over the WFD interface.

11. The method of claim 10, wherein each of the first wearable device, the second wearable device and the third wearable device exchange capability parameters with proximal device in the P2P network to determine a received power from frame's power level estimated at respective receiving antennae at a physical layer.

12. The method of claim 10, wherein the received power is used to estimate distance between each devices in the P2P communication network, and wherein the first wearable device discovers the second wearable device by:
    receiving an advertisement message from the second wearable device, wherein the advertisement message comprises information related to a service of interest, a profile data of the second wearable device, WFD capabilities supported by the second wearable device, a location of the second wearable device, service messages of other peer devices stored at the second wearable device, and location of other peer device stored at the second wearable device;
    automatically generating a service message comprising information related to a service of interest, a profile data of the first wearable device, WFD capabilities supported by the first wearable device, service messages of other peer devices stored at the first wearable device, and location of other peer device stored at the first wearable device;
    sending the service message to the second wearable device using the BLE interface; determining a location information of the first wearable device in the Wireless mesh network; and
    sending the location information to the second wearable device using the BLE interface.

13. The method of claim 10, further comprising: dynamically determining by the first wearable device a state of the first wearable device and an activity of a user, wherein the activity of the user comprises a motion information of the user, a posture information of the user, and an action performed by the user; and
    automatically controlling by the first wearable device at least one operation of at least one of the BLE interface and the WFD interface of the first wearable device based on the state of the first wearable device and the activity of the user.

14. A method for managing P2P communication in a wireless mesh network, comprising: dynamically determining by a first wireless device a state of the first wireless device and an activity of a user, wherein the activity of the user comprises a posture information and an action performed by the user; and
    automatically controlling by the first wireless device at least one operation of at least one of a BLE interface and a WFD interface of the first wireless device based on the state of the first wireless device and the activity of the user;
    receiving, by the first wireless device, a relay message from a second wireless device in the wireless mesh network over a WFD interface, wherein said relay message includes a destination identifier indicating a third wireless device and a profile data of the second wireless device, wherein the second wireless device is in range of the second wireless device and not in range of the third wireless device;
    determining by the first wireless device a route to the third wireless device based on a local device list stored at the second wireless device;
    determining by the first wireless device a next hop-mobile device based on the route to the third wireless device in the wireless mesh network, wherein the second wireless device is in range of the next-hop device; and
    sending by the first wireless device the relay message to the next hop-mobile device over a WFD interface.

15. The method of claim 14, wherein the first wireless device, the second wireless device and the third wireless device is one of a wearable device and a non-wearable device, wherein the activity of the user is used to dynamically update a location of the first wireless device in the wireless mesh network.

16. The method of claim 14, further comprising: discovering, by the first wireless device, a location of at least one second wireless device in the wireless mesh network using a Bluetooth Low Energy (BLE) interface;
    determining, by the first wireless device, a match between a profile data of the first wireless device with a profile data of the at least one second wireless device based on the location of the at least one second wireless device;
    sending, by the first wireless device a profile matching notification to the at least one second wireless device using the BLE interface;
    receiving, by the first wireless device, a request to establish the P2P communication from the at least one second wireless device; and
    establishing, by the first wireless device, the P2P communication with the at least one second wireless device using the WED interface.

17. A wireless device for managing Peer-to-Peer (P2P) communication in a wireless mesh network, comprising:
    a processor; a memory; and
    an operational controller, operably coupled with the memory and the processor, configured to:
    discover a presence of at least one mobile device and a distance between the wireless device and at least one mobile device in proximity in the wireless mesh network using a combination of Bluetooth Low Energy (BLE) interface and Wi-Fi Direct (WFD) interface;
    determine a match between a profile data of the wireless device with a profile data of the at least one mobile device based on the presence of the at least one mobile device and the distance between the wireless device and at least one mobile device in proximity; and
    send a profile matching notification to the at least one mobile device using the BLE interface;
    receive a relay message from a second wireless device in the wireless mesh network over a WFD interface, wherein the relay message includes a destination Identifier indicating a third wireless device and a profile data of the second wireless device, wherein the wireless device is in range of the second wireless device and is not in range of the third wireless device;

determine a route to the third wireless device based on a local device list stored at the second wireless device;

determine a next hop-device based on the route to the third wireless device in the wireless mesh network, wherein the second wireless device is in range of the next-hop device; and send the relay message to the next hop-device over a WFP interface; wherein each of the wireless device, the second wireless device, and the third wireless device exchanges capability parameters with immediate next device in the wireless mesh network to determine a received power from frame's power level estimated at respective receiving antennae at a physical layer, and wherein the received power is used to estimate distance between each devices in the wireless mesh network.

18. The wireless mobile device of claim 17, wherein the operational controller is further configured to:

receive a request to establish the P2P communication from the at least one mobile device; and establish the P2P communication with the at least one mobile device using the WFD interface.

19. The wireless device of claim 17, wherein the operational controller is further configured to;

dynamically determine a state of the wireless device and an activity of a user; and automatically control at least one operation of at least one of the BLE interface and the WFD interface of the wearable device based on the state of the wireless device and the activity of the user.

20. The wireless device of claim 17, wherein the activity of the user comprises a motion information of the user, a posture information of the user, and an action performed by the user, and wherein the activity of the user is used to dynamically update the location of the wireless mobile device in the Wireless mesh network.

21. A wearable device for managing P2P communication in a wireless mesh network, comprising:

a processor;

a memory; and an operational controller, operably coupled with the memory and the processor, configured to: receive a relay message from a second wearable device in the wireless mesh network over a WFD interface, wherein the relay message includes a destination identifier indicating a third wearable device and a profile data of the second wearable device, wherein the wearable device is in range of the second wearable device and is not in range of the third wearable device, determine a route to the third wearable device based on a local device list stored at the second wearable device, determine a next hop-mobile device based on the route to the third wearable device in the wireless mesh network, wherein the second wearable device is in range of the next-hop device, and send the relay message to the next hop-mobile device over a WFD interface.

22. The wearable device of claim 21, wherein each of the wearable device, second wearable device and the third wearable device exchange capability parameters with immediate next device in the P2P network to determine a received power from frame's power level estimated at respective receiving antennae at a physical layer.

23. The wearable device of claim 22, wherein the received power is used to estimate distance between each devices in the P2P communication network, and wherein the wearable device discovers the second wearable device by:

receive an advertisement message from the second wearable device, wherein the advertisement message comprises information related to a service of interest, a profile data of the second wearable device, WFD capabilities supported by the second wearable device, a location of the second wearable device, service messages of other peer devices stored at the second wearable device, and location of other peer device stored at the second wearable device, automatically generate a service message comprising information related to a service of interest, a profile data of the wearable device, WFD capabilities supported by the wearable device, service messages of other peer devices stored at the wearable device, and location of other peer device stored at the wearable device, send the service message to the second wearable device using the BLE interface, determine a location information of the wearable mobile device in the wireless mesh network, and send the location information to the second wearable device using the BLE interface.

24. The wearable device of claim 21, further the operational controller is configured to:

dynamically determine a state of the wearable device and an activity of a user, wherein the activity of the user comprises a motion information of the user, a posture information of the user, and an action performed by the user; and automatically control at least one operation of at least one of the BLE interface and the WFD interface of the wearable mobile device based on the state of the wearable mobile device and the activity of the use.

25. A wireless device for managing P2P communication in a wireless mesh network, comprising:

a processor; a memory; and an operational controller, operably coupled with the memory and the processor, configured to:

dynamically determine a state of the wireless device and an activity of a user, wherein the activity of the user comprises a posture information and an action performed by the user, and automatically control at least one operation of at least one of a BLE interface and a WFD interface of the wireless device based on the state of the wireless device and the activity of the user, receive a relay message from a second wireless device in the wireless mesh network over the WED interface, wherein the relay message includes a destination identifier indicating a third wireless device and a profile data of the second wireless device, wherein the wireless device is in range with the second wireless device and is not in range of the third wireless device, determine a route to the third wireless device based on a local device list stored in the second wireless device, determine a next hop-hop device based on the route to the third wireless device in the wireless mesh network, wherein the second wireless device is in range of the next-hop device, and send the relay message to the next hop-device over the WFP interface.

26. A wireless of claim 25, wherein the activity of the user is used to dynamically update the location of the wearable device in the Wireless mesh network.

27. A wireless of claim 25, the operational controller is further configured to:
- discovery a location of at least one wireless device in the Wireless mesh network using a Bluetooth Low Energy (BLE) interface,
- determine a match between a profile data of the wearable device with a profile data of the at least one wireless device based on the location of the at least one mobile device;
- send a profile matching notification to the at least one wireless device using the BLE interface,
- receive a request to establish the P2P communication from the at least one wireless device, and
- establish the P2P communication with the at least one wireless device using the WFD interface.

* * * * *